United States Patent
Lowery

(10) Patent No.: US 7,693,429 B1
(45) Date of Patent: Apr. 6, 2010

(54) OPTICAL OFDM TRANSMISSION WITH IMPROVED EFFICIENCY

(75) Inventor: Arthur James Lowery, Kew (AU)

(73) Assignee: Ofidium Pty., Ltd., Melbourne (AU)

( * ) Notice: Subject to any disclaimer, the term of this patent is extended or adjusted under 35 U.S.C. 154(b) by 0 days.

(21) Appl. No.: 12/422,663

(22) Filed: Apr. 13, 2009

(51) Int. Cl.
   *H04B 10/04* (2006.01)
(52) U.S. Cl. ...................... 398/192; 398/182
(58) Field of Classification Search ............... 398/192, 398/182, 183, 193
   See application file for complete search history.

(56) References Cited

U.S. PATENT DOCUMENTS

2009/0324223 A1 * 12/2009 Xiang ................... 398/65
2009/0324226 A1 * 12/2009 Buchali et al. ............. 398/76

FOREIGN PATENT DOCUMENTS

WO   WO 2008092193 A1   8/2008

OTHER PUBLICATIONS

Djordjevic, I.B. et al., LDPC-Coded OFDM in Fiber-Optics Communication Systems [Invited], Journal of Optical Networking, Mar. 2008, 7(3), 10 pages.
Shieh, W. et al., "High-Speed and High Spectral Efficiency Coherent Optical OFDM", IEEE, 2008, 2 pages.
Jansen, S.L. et al., "10×121.9-Gb/s PDM-OFDM Transmission with 2-b/s/Hz Spectral Efficiency over 1000 km of SSMF", KDDI R&D Laboratories, Saitama, Japan, 2007, Optical Society of America, 3 pages.
Yonenaga, K. et al., "100 Gbit/s All-Optical OFDM Transmission Using 4 x× 25 Gbit/s Optical Duobinary Signals with Phase-Controlled Optical Sub-Carriers", IEEE Xplore, Downloaded from Internet Apr. 2, 2009, 3 pages.

* cited by examiner

*Primary Examiner*—Quan-Zhen Wang
(74) *Attorney, Agent, or Firm*—Woodcock Washburn LLP

(57) ABSTRACT

A method of transmitting digital information over a dispersive optical channel includes encoding the digital information into a series of data blocks, wherein each block comprises a plurality of substantially orthogonal frequency domain subcarriers. Each data block is then divided into at least two frequency bands, each band comprising a plurality of contiguous subcarriers. A frequency/time transformation is then performed, in order to form a corresponding plurality of transformed bands, each transformed band comprising a sequence of time domain data samples. A time delay is applied to at least one of the transformed bands relative to at least one other of the transformed bands. The bands are then combined to produce an electrical signal waveform embodying the digital information. Finally, an optical source is modulated using the electrical signal waveform, to produce a corresponding optical signal for transmission over the dispersive optical channel. The invention enables a reduction in the duration of guard intervals that may need to be inserted into the transmitted data blocks, in order to avoid received signal degradation due to inter-symbol interference caused by dispersion in the optical channel. Transmission overheads may thereby be reduced, resulting in an improvement in transmission efficiency.

20 Claims, 5 Drawing Sheets

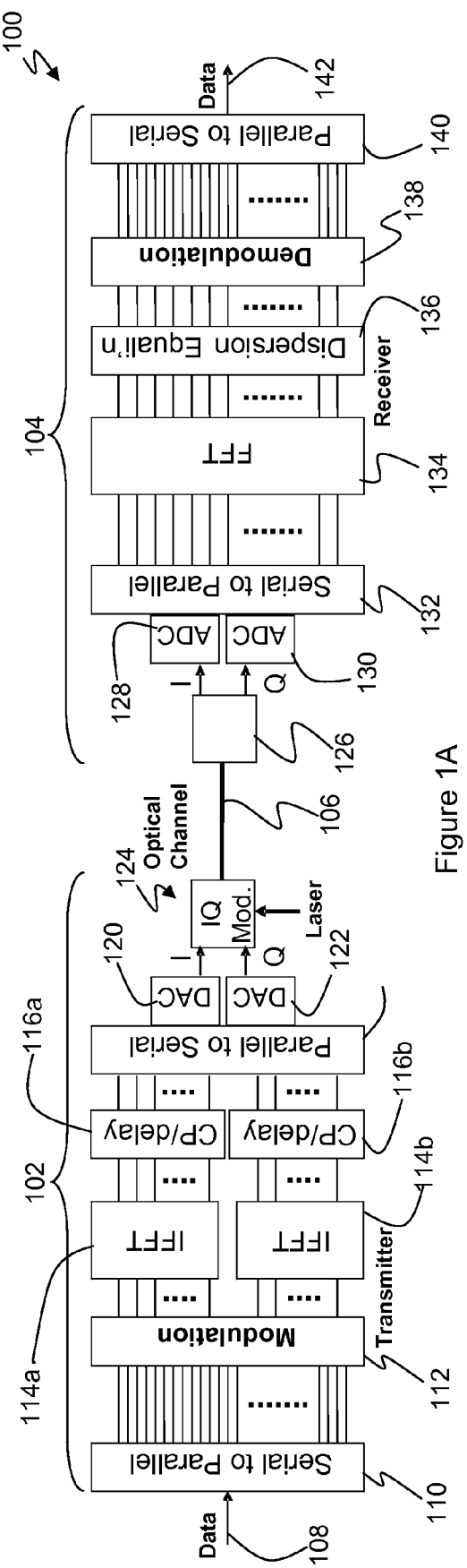
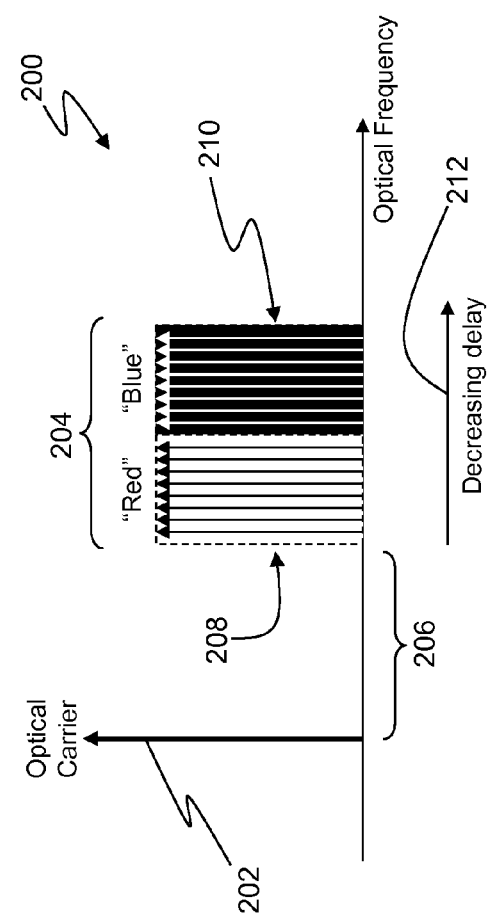
Figure 1A
Figure 2

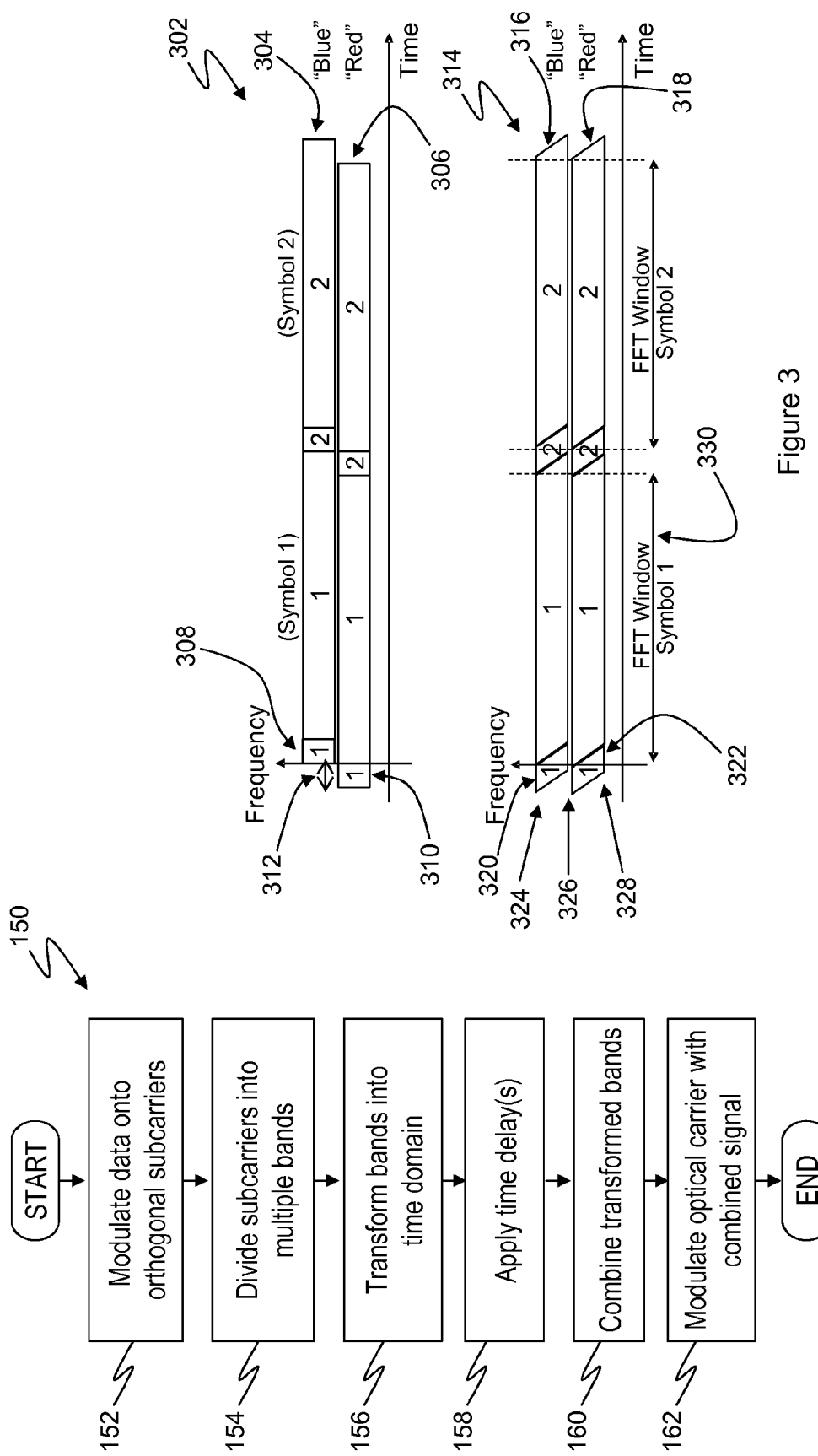

OPTICAL OFDM TRANSMISSION WITH IMPROVED EFFICIENCY

TECHNICAL FIELD

The present invention relates generally to optical communications, and more particularly to improvements in the efficiency of optical transmission systems utilising orthogonal frequency division multiplexing (OFDM), and related techniques, in order to mitigate transmission impairments, such as chromatic dispersion, occurring within the optical channel.

BACKGROUND

Orthogonal frequency division multiplexing (OFDM) is a scheme for the transmission of digital data which utilises a large number of closely-spaced orthogonal subcarriers. In particular, digital information is effectively encoded into several parallel data streams, or channels, each of which is allocated to one subcarrier. The information is modulated onto the subcarriers using a conventional modulation scheme, such as quadrature amplitude modulation (QAM) or phase shift keying (PSK), at a symbol rate that is low, relative to the overall data transmission rate. The overall transmission capacity of OFDM systems is generally comparable to conventional single-carrier, or baseband, modulation schemes utilising the same bandwidth. A primary motivation for the use of OFDM in preference to single-carrier, or baseband, transmission is the ease with which channel equalisation may be performed. Equalisation is simplified because OFDM effectively employs many relatively slowly-modulated narrowband signals, rather than one rapidly-varying wideband signal. Furthermore, OFDM systems may be implemented very efficiently by utilising an inverse fast Fourier transform (FFT) at the transmitting end to generate the OFDM signal, and a forward FFT at the receiving end to recover the narrowband subcarrier channels.

OFDM has become particularly popular in wireless communications systems, because the duration of each symbol is relatively long compared to relevant time characteristics of radio channels, such as the differential delays caused by multipath propagation. As a result, OFDM signals suffer less from inter-symbol interference caused by multipath propagation than equivalent single-carrier signals. Indeed, by introducing a guard interval between consecutive OFDM symbols, inter-symbol interference may be eliminated altogether. So long as the duration of each symbol is long, compared with the guard interval, as is the case in typical wireless transmission systems, the resulting decrease in transmission efficiency is negligible.

In OFDM systems employing the FFT algorithm for modulation and demodulation, is advantageous to transmit a so-called "cyclic prefix" during the guard interval. Specifically, the guard interval precedes a corresponding OFDM symbol, and the cyclic prefix consists of a copy of the end portion of the OFDM symbol. This approach ensures that periodicity of the signal input to the FFT in the receiver is maintained, in the presence of inter-symbol interference having a total time spread that is less than the duration of the guard interval and cyclic prefix.

More recently, there has been increasing interest in utilising OFDM and related techniques within optical communications systems. One such approach, which also employs optical single sideband (OSSB) transmission via optical fibre, is disclosed in International Publication No. WO 2007/041799, which is incorporated herein in its entirety by reference. It has been recognised, in particular, that OFDM equalisation techniques may be employed to provide compensation within the electrical domain for the effects of chromatic dispersion occurring during transmission via single-mode optical fibres. Advantageously, electronic dispersion compensation methods enable optical links to be modified, reconfigured and/or upgraded without the need to replace or reconfigure outside plant, such as conventional optical dispersion compensators, eg dispersion-compensating fibre. The modifications necessary in order to compensate for changed dispersion characteristics occur only within the transmitter and/or receiver electronics, and in many cases may be performed without the need to replace hardware, and possibly even in a fully automated and adaptive manner without human intervention. This latter feature is particularly useful in dynamically-reconfigurable optical networks.

However, the deployment of OFDM within optical systems presents new challenges, because the relevant characteristics of typical transmitted optical signals are quite different from those of radio signals, in relation to which OFDM has so far most commonly been employed. In typical wireless systems, an OFDM signal may include on the order of hundreds to thousands of subcarriers, occupying a bandwidth on the order of hundreds of megahertz, with a subcarrier spacing of a few kilohertz, in order to achieve a net bit rate on the order of one to 10 megabits-per-second. In such systems, the symbol length is on the order of tens to hundreds of microseconds. In most applications, guard intervals having a duration of less than 25 percent of the symbol length may be used. Optical transmission systems, on the other hand, are commonly required to operate a bit rate of up to 10 Gbps, and beyond. An optical OFDM system employing hundreds of subcarriers over a bandwidth on the order of 10 gigahertz, has a subcarrier spacing in the range of tens to hundreds of megahertz. The typical symbol length is thus on the order of tens to hundreds of nanoseconds. Accordingly, if the inclusion of guard intervals is not to impact excessively on transmission efficiency, the duration of such intervals must be kept on the order of a few nanoseconds or less. However, since the extent of possible inter-symbol interference, and hence the required guard interval duration, is dependent upon characteristics of the optical channel, the required length of the guard interval may not be within the control of the system designer. Furthermore, a major source of inter-symbol interference in single-mode optical fibre transmission systems is chromatic dispersion, in accordance with which the differential delay experienced across the transmitted signal spectrum generally increases with increasing signal bandwidth. If, at the same time, the number of subcarriers is held constant, the bandwidth of each subcarrier will increase in proportion, and the symbol length will accordingly decrease. The required guard interval will therefore rapidly become comparable to the symbol length.

One solution would be to use a much larger number of subcarriers in optical OFDM systems. However this approach has a number of disadvantages. Firstly, the size of the FFT implementations used in the transmitter and receiver is necessarily equal to the number of subcarriers, and accordingly increasing the number of subcarriers increases the size of the FFTs required. This may be particularly disadvantageous in high-capacity transmission systems, wherein the FFTs are likely to be implemented in hardware, and accordingly the required silicon area, and wiring complexity, may be significantly increased. Additionally, some implementations of optical OFDM transmission utilise coherent receivers to convert the optical signal back into a corresponding electrical signal. Coherent detection is particularly susceptible to laser phase noise when narrowband subcarriers are used, and it is accordingly preferable to use a smaller number of widerbandwidth subcarriers in such systems. As noted above, this is incompatible with the use of longer symbols in order to reduce the overhead due to required guard intervals.

Accordingly, it is an object of the present invention to provide methods and apparatus enabling improved efficiency of data transmission in optical OFDM systems, by reducing the duration of guard intervals required relative to the symbol length.

SUMMARY

In one aspect, the present invention provides a method of transmitting digital information over a dispersive optical channel, comprising the steps of:

encoding the digital information into a series of data blocks, each block comprising a plurality of substantially orthogonal frequency domain subcarriers;

dividing each data block into at least two frequency bands, each band comprising a plurality of contiguous subcarriers;

performing a frequency-time transformation of each band to form a corresponding plurality of transformed bands, each transformed band comprising a sequence of time domain data samples;

applying a time delay to at least one of the transformed bands relative to at least one other of the transformed bands;

combining the transformed bands to produce an electrical signal waveform embodying the digital information; and modulating an optical source using the electrical signal waveform, to produce a corresponding optical signal for transmission over the dispersive optical channel.

Advantageously, embodiments of the invention are based upon the recognition by the present inventor that the predictable characteristics of chromatic dispersion in single-mode optical fibres may be utilised to mitigate the effects of inter-symbol interference occurring during transmission through such fibres. In particular, the maximum differential delay between components of a transmitted optical signal under the influence of chromatic dispersion tends to be a monotonically increasing function of the total signal bandwidth. Thus narrowband signals experience lower levels of differential delay, and hence require shorter guard intervals, than wideband signals. The invention is based upon dividing the overall transmitted signal into a plurality of narrower bands, each of which will experience a lower differential delay, and then accounting for the average differences in transmission delay between the various bands by applying corresponding time delays to the transformed bands.

In preferred embodiments, the method further includes inserting a guard interval having a predetermined duration between consecutive data blocks of each transformed band. Accordingly, embodiments of the invention enable the guard interval overhead to be controlled, by selection of the total bandwidth of each frequency band, even if the total signal bandwidth and/or total chromatic dispersion is very high.

Preferably, the predetermined duration of the guard interval is greater than the maximum time delay due to dispersion of the optical channel across any of the transmitted frequency bands. Advantageously, this ensures that inter-symbol interference due to chromatic dispersion may be avoided altogether.

In preferred embodiments, each guard interval precedes a corresponding data block, and is populated with a copy of data symbols comprising an end portion of the corresponding transformed band. That is, the guard interval may comprise a cyclic prefix. Alternatively, a "cyclic postfix" approach may be followed, in which each guard interval follows a corresponding data block, and is populated with a copy of data symbols comprising an initial portion of the corresponding transformed band. Due to the periodic nature of the FFT algorithm, the only difference between a cyclic prefix approach and a cyclic postfix approach is a relative phase shift in the received subcarriers, which is eliminated by equalisation at the receiver.

In embodiments in which the chromatic dispersion is approximately constant across the total bandwidth of the transmitted optical signal, and the frequency bands are of substantially equal bandwidth, the maximum differential delay between adjacent frequency bands may be preferably approximately equal to the duration of the guard interval. However, in a range of embodiments it is anticipated that the maximum difference in the time delays applied to the transformed bands may be between 0.5 and 2.0 times the duration of the guard interval.

In another aspect, the invention provides an apparatus for transmitting digital information over a dispersive optical channel, the apparatus comprising:

an encoder configured to encode the digital information into a series of data blocks, each block comprising a plurality of substantially orthogonal frequency domain subcarriers, and wherein each data block comprises at least two frequency bands including a plurality of contiguous subcarriers;

one or more frequency-time transformers configured to transform each band to form a corresponding plurality of transformed bands each comprising a sequence of time domain data samples;

a time domain processor configured to apply a time delay to at least one of the transformed bands relative to at least one other of the transformed bands, and to combine the transformed bands to produce an electrical signal waveform embodying the digital information; and an optical transmitter comprising an optical source and an optical modulator, wherein the signal waveform is applied to the optical modulator to produce a corresponding optical signal for transmission over the dispersive optical channel.

In preferred embodiments the encoder, frequency-time transformers and time-domain processor may be implemented using digital hardware and/or software means, as is well-known in the art of digital signal processing. For example, any or all of these components may be implemented wholly or in-part using a digital signal processor (DSP) with suitable programming. Alternatively, custom, or semi-custom application-specific integrated circuits (ASIC's) may be used to implement some or all of the functionality of the encoder, frequency-time transformers and time-domain processor. Programmable hardware, such as field-programmable gate arrays (FPGA's) and/or complex programmable logic devices (CPLD's) may also be employed.

The time domain processor is preferably further configured to insert a guard interval having a predetermined duration between consecutive data blocks of each transformed band.

Further benefits, advantages and preferred features of the method and apparatus of the present invention will become apparent in the following description of preferred embodiments of the invention, which should not be considered to be limiting of the scope of the invention as disclosed in the preceding statements and defined in the claims appended hereto.

BRIEF DESCRIPTION OF THE DRAWINGS

Preferred embodiments of the invention are described with reference to the accompanying drawings, in which:

FIG. 1A illustrates schematically a system for communicating digital information over a dispersive optical channel in accordance with a preferred embodiment of the invention;

FIG. 1B is a flowchart illustrating a method of transmitting information over a dispersive optical channel as implemented by the system of FIG. 1A;

FIG. 2 shows schematically the optical spectrum of a signal generated in accordance with a preferred embodiment of the invention;

FIG. 3 is a schematic diagram illustrating the transmission of frequency bands using relative time delays, according to a preferred embodiment of the invention;

DETAILED DESCRIPTION OF ILLUSTRATIVE EMBODIMENTS

Figure 4B:
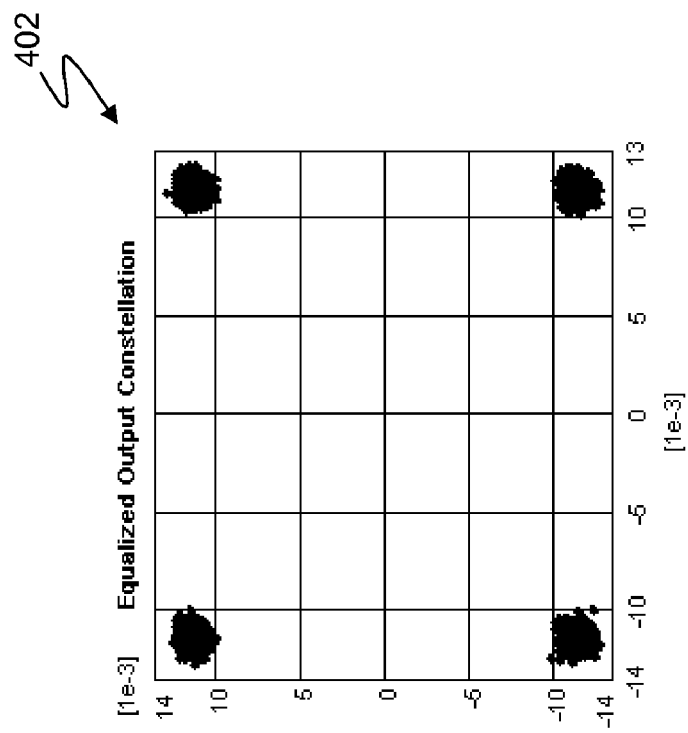
FIGS. 4A and 4B show example constellation patterns of received signals after transmission over 500 km of dispersive optical fibre.

FIG. 1 illustrates schematically a system 100 for communicating digital information over a dispersive optical channel, according to a preferred embodiment of the present invention. The exemplary system 100 includes transmission apparatus 102 and receiving apparatus 104, which for convenience are more generally referred to herein as the "transmitter" and the "receiver" respectively.

The transmitter 102 communicates with the receiver 104 via optical channel 106, which generally exhibits linear optical dispersion, including chromatic dispersion and polarisation mode dispersion. The optical channel 106 may also exhibit non-linear transmission characteristics. While embodiments of the present invention may be employed in systems which also incorporate non-linear compensation methods, such as those disclosed in International Application Publication No. WO 2008/075085, the invention is directed primarily to improving compensation for linear dispersion processes, and chromatic dispersion in particular.

Although in FIG. 1 details of the optical channel 106 are not shown, it will be appreciated by those skilled in the art of optical communications that it may generally consist of a plurality of spans of single-mode optical fibre, with optical amplifiers, such as Erbium-doped fibre amplifiers, disposed between pairs of spans in order to compensate for the attenuation of signals within the single-mode fibre.

At the transmitter 102, digital data is applied at input 108 in a serial format. The input digital data is simply a sequence of binary digits representing digital information for transmission via the optical channel 106, typically having a fixed data rate, such as 2.5 Gbps, 10 Gbps, 40 Gbps, or higher. The input digital data is converted from serial to parallel form in serial-to-parallel converter 110. A modulator 112 includes a set of mapping units which encode the parallel input data bits to provide a corresponding block of encoded symbol values. Specifically, each mapping unit receives one or more input bits which are mapped to a value representing a corresponding modulated subcarrier of an orthogonal frequency division multiplexed (OFDM) signal. For example, a 4-QAM modulation may be employed, wherein pairs of data bits are mapped onto corresponding complex values representing the amplitude and phase modulation to be applied to a corresponding frequency carrier of the transmitted signal. Lower or higher order QAM mapping schemes may equally be employed, and alternative modulation methods may also be used, including, but not limited to, OOK, ASK, PSK, FSK and so forth.

The output of the modulator 112 is accordingly a frequency domain representation of a plurality of subcarriers onto which has been modulated a block of the input digital data. In accordance with common OFDM implementation, the plurality of orthogonal subcarriers may be converted into a corresponding time domain signal suitable for transmission by utilising an inverse FFT algorithm. In accordance with the preferred embodiment of the transmitter 102 illustrated in FIG. 1, the set of subcarriers comprising each data block is divided into two frequency bands, each of which is transformed by a corresponding inverse FFT 114a, 114b. It should be understood that a larger number of frequency bands may alternatively be employed, and that analogous embodiments will utilise a corresponding larger number of inverse FFT blocks. In general, the architecture of the embodiment 100 may readily be adapted to utilise any number of frequency bands, in accordance with system requirements.

The outputs of the inverse FFT blocks 114a, 114b are corresponding time domain representations of the input subcarrier bands. These outputs are transferred to a time domain processor, which includes components for adding a cyclic prefix and delay 116a, 116b, and for combining the resulting signals and converting to serial form 118. Further details of the function of these blocks are discussed below with reference to FIGS. 2 and 3. While not shown in the exemplary system 100, the time domain processing may also include nonlinearity pre-compensation, for example as disclosed in International Application Publication No. WO 2008/075085.

The outputs of the parallel-to-serial converter 118 are input to dual digital-to-analog converters 120, 122, to produce time-varying waveforms representing the real and imaginary components (ie in-phase and quadrature) of the transmitted signal. These outputs are utilised to drive an IQ modulator 124, which according to the preferred embodiment 100 modulates an optical source, such as a laser generating an output optical carrier wave, to produce an optical signal having in-phase and quadrature components corresponding with the information-bearing outputs of the digital-to-analog converters. In accordance with preferred embodiments of the invention, the optical signal generated using the IQ modulator 124 is an optical single sideband (OSSB), which may be transmitted with or without an accompanying optical carrier.

The receiver 104 of the exemplary embodiment 100 may be implemented in accordance with prior art OFDM demodulation and equalisation principles. Indeed, this is a particular advantage of the present invention, whereby the transmitter may be adapted in order to provide improved characteristics for compensation of dispersion within the optical channel 106, without the need for any corresponding modifications to the receiver 104.

Briefly, the receiver 104 comprises an optical detector 126, such as a photodiode along with associated electronics for amplifying the detected signal and recovering the in-phase and quadrature components. These components are input to analog-to-digital converters 128, 130, reproducing a corresponding sequence of sampled signal values in the time domain. Serial-to-parallel converter 132 converts the serial sequence of time values into a corresponding parallel sequence of complex data values. A forward FFT 134 converts the time samples into a corresponding plurality of frequency domain values, representing the received subcarriers. The block of received subcarrier values is input to dispersion equalisation units 136, which apply an appropriate phase shift to each symbol value in order to compensate for frequency-dependent dispersion of the optical channel 106. The operation of the dispersion equalisation method and apparatus are described in greater detail, for example, in International Application Publication No. WO 2007/041799, which is incorporated herein in its entirety by reference. A demodulator 138 includes demapping units which reverse the mapping function of the mapping units in modulator 112, eg reversing 4-QAM modulation in the preferred embodiments 100, to produce a corresponding parallel sequence of digital information bits. Parallel-to-serial converter 140 converts the bits back into serial format at output 142. Under ideal, error free, operation of the system 100, the bits appearing at output 142, of the receiver 104 are identical with the bits applied to input 108 of transmitter 102.

As will be appreciated, in any practical implementation errors in transmission of information may occur, for example due to noise processors occurring within the electrical and optical transmission paths. Additionally, the dispersion compensation may be imperfect, for example due to total dispersion exceeding the guard interval provided by the cyclic prefix, as discussed below with reference to FIGS. 5A and 5B. However, although not shown in FIG. 1, it will be appreciated that in a practical implementation techniques such as forward error correction (FEC) may be applied in order to mitigate, or entirely eliminate errors in data transmission. Accordingly, the exemplary transmission system 100 need not be perfect so long as an acceptable error rate is achieved which is sufficiently low to enable FEC methods to recover the original information. Such techniques are well-known in the art of digital communications, and therefore will not be discussed in greater detail herein.

The transmitter 102 and receiver 104 may be implemented using a variety of digital and analog electronic technologies, in accordance with well-known engineering principles, once the desired functionality has been determined, in accordance with embodiments of the invention. Suitable technologies for implementing the serial-to-parallel converter 110, the modulator 112, the inverse FFT's 114a, 114b and the time-domain processor including the CP/delay units 116a, 116b and parallel-to-serial converter 118, include: digital signal processors (DSP's) with appropriate programming; custom and/or semi-custom application-specific integrated circuits (ASIC's); programmable hardware, such as field-programmable gate arrays (FPGA's) and/or complex programmable logic devices (CPLD's); or any combination of the foregoing. Similar technologies may be used in the implementation of the receiver 104.

A general method for transmitting information over a dispersive optical channel, in accordance with an embodiment of the invention and as implemented by the system 100, is illustrated in the flowchart 150 in FIG. 1B. At step 152 input information is modulated onto a plurality of orthogonal subcarriers. At step 154, the subcarriers are divided into multiple frequency bands, eg at least two frequency bands, wherein each band consists of a plurality of contiguous subcarriers. At step 156 a frequency-time transformation is performed, in order to form a plurality of transformed bands, corresponding with the input frequency bands, each of which includes a sequence of time domain data samples. At step 158 a time delay is applied to at least one of the transformed bands relative to at least one other of the transformed bands, as described in greater detail below with reference to FIGS. 2 and 3. At step 160 the transformed bands are combined in order to produce an electrical signal waveform embodying the digital information, and the signal is modulated onto an optical carrier for transmission, at step 162.

FIG. 2 illustrates schematically a transmitted optical spectrum such as may be generated by the transmitter 102 of the preferred embodiment 100. In particular, the spectrum 200 includes the optical carrier 202, and a single sideband 204 including the plurality of orthogonal subcarriers generated by the modulator 112. Preferably, a frequency guard band 206 is provided between the optical carrier 202 and the sideband 204 which prevents inter-modulation products from interfering with the received subcarriers during the process of detection at the receiver 104.

In the transmitter 102, in which the subcarriers are divided into two frequency bands via separate inverse FFTs 114a, 114b, the sideband 204 includes subcarriers 208 belonging to a first, lower-frequency, band, and subcarriers 210 belonging to a second, higher-frequency, band. For ease of reference, these two bands are hereafter respectively referred to as the "red" band 208 and the "blue" band 210, by analogy with colours of the visible spectrum, although it will be appreciated that in a practical implementation the transmission frequencies will be within the infrared range, such as around 1550 nm wavelength.

For most conventional single-mode optical transmission fibres having positive dispersion, lower frequencies within the transmission band propagate more slowly than higher frequencies. This decreasing delay with optical frequency is illustrated by the arrow 212 in FIG. 2. By way of example, a standard single-mode optical fibre having a chromatic dispersion of D=16 ps/nm/km causes a lower frequency signal component to be delayed by approximately 1 ns relative to a higher frequency signal component which is separated by 15 GHz (ie 0.121 nm at 1550 nm wavelength), in the course of transmission over 500 km. In order to account for corresponding "time spreading" of the transmitted signal, a guard interval may be inserted between consecutive data blocks of the transmitted signal, which is preferably filled with a cyclic prefix consisting of a copy of the data symbols comprising an end portion of the corresponding transmitted block. The "window" of the FFT 134 in the receiver is synchronised so as to encompass the nominal data block transmission period, whereby delayed information from the cyclic prefix "replaces" corresponding information delayed beyond the end of the window. As a result, no information is lost, and no inter-symbol interference occurs, as a result of the time spreading, so long as the guard interval and cyclic prefix is equal to or greater than the time spreading caused by dispersion with in the optical channel 106. However, as the length (ie transmission distance) of the optical channel 106 increases, the total dispersion and time spreading experienced by the transmitted signal also increases, requiring a corresponding increase in the duration of the guard interval and cyclic prefix. Ultimately, the inclusion of the guard interval will become a significant, and unacceptable, overhead within the transmission system 100, and it is an object of embodiments of the present invention to reduce this undesirable overhead.

FIG. 3 is a schematic illustration showing the manner in which relative time delays applied to different transformed bands serve to reduce the duration of the guard interval and cyclic prefix. Again, the exemplary embodiment utilising two frequency bands is illustrated, however a larger number of bands may be employed in order to further reduce the required duration of the guard interval and/or to enable higher levels of dispersion to be compensated without excessive penalty due to inter-symbol interference.

FIG. 3 first illustrates a frequency/time diagram 302 representing the two frequency bands as generated at the transmitter 102. In particular, the transformed signal representing the red band (ie the output of inverse FFT 114a), which will experience a greater propagation delay through the optical channel, is represented by the lower bar 306 of the frequency/time diagram 302, whereas the transformed signal representing the blue band (ie the output of inverse FFT 114b) is represented by the upper bar 304. Two consecutive symbols from each band, and their associated guard intervals and cyclic prefixes, are shown in FIG. 3. For example, a cyclic prefix 308 precedes the first symbol of the blue band 304, while a cyclic prefix 310 precedes the first symbol of the red band 306. In addition, a time delay 312 is applied to the blue band 304, relative to the red band 306. As shown in the frequency/time diagram 302, the time delay 312 is equal to the duration of the cyclic prefixes 308, 310, however as discussed below alternative durations for the time delay may be appropriate and/or advantageous depending upon the properties of the optical channel 106.

FIG. 3 also shows the corresponding frequency/time diagram 314 at the receiving end, ie after transmission through the dispersive optical channel 106. Due to chromatic dispersion, propagation of the blue band has been advanced relative to propagation of the red band, on average. Furthermore, propagation of the highest frequencies within each band has been advanced relative to propagation of the lower frequencies. More particularly, the received blue band is illustrated by the bar 316, whereas the received red band is illustrated by the bar 318. Due to the differences in average propagation delay, the blue band and the red band are, on average, aligned in time. For example, the cyclic prefix 320 of the blue band 316 occupies the same time interval at the receiver as the cyclic prefix 322 of the red band 318. Taking the frequency at the boundary between the red and blue bands as a reference, no relative time shift occurs between transmitter and receiver at this reference frequency 326. That is, adjacent to the reference frequency 326 the highest frequency of the red band 318 arrives at the receiver in advance of the lowest frequency of the blue band 316 by the initial delay period 312. However, due to chromatic dispersion within the optical channel 106, the highest frequency 324 of the blue band 316 arrives at the receiver at the same time as the highest frequency of the red band 318, whereas the lowest frequency 328 of the red band 318 arrives at the receiver at the same time as the lowest frequency of the blue band 316. Accordingly, by aligning the FFT transformation window 330 at the receiver 104 to commence at the time of arrival of the lowest frequency of the red and blue bands 318, 316, all of the original transmitted data may be reliably recovered without unacceptable degradation due to inter-symbol interference.

In the absence of time delay 312 between the transmitted red band 306 and the transmitted blue band 304, it will be necessary to employ a guard interval and cyclic prefix having twice the duration of guard intervals 308, 310, in order to avoid inter-symbol interference at the receiver. Implementation of the time delay is relatively straightforward within the transmitter 102, and requires, for example, only that sufficient buffering is provided for the delayed data within the CP/delay block 116b for the blue band. As previously noted, no modifications are required to the receiver 104, which will readily adapt to the discontinuous phase shift occurring in the recovered subcarriers at the boundary 326 between the received red band 318 and the received blue band 316, and compensate accordingly within the equalisation block 136.

In order to verify the effectiveness of the system 100, a number of computer simulations have been performed, the results of which are illustrated in FIGS. 4A, 4B, 5A, 5B and 6. The simulations utilised a data rate of 60 Gbps, with a data block length of 1,024 bits. The modulation scheme employed in the modulator 112 was 4-QAM. Accordingly, the total number of subcarriers in the simulated system was 512, which was split into two bands each including 256 subcarriers. The guard interval, populated with a cyclic prefix, had a duration equal to one-sixteenth of the symbol period. Specifically, the symbol period for 1,024 bits at 60 Gbps is 16.6 nanoseconds, and accordingly the guard interval was of approximately a one-nanosecond duration. The total bandwidth of the transmitted sideband 204 was 30 GHz, with a guard band 206 also of 30 GHz, separating the sideband 204 from the optical carrier 202. Accordingly, the separation between the optical carrier 202, and the centre of the signal band 204 was 45 GHz.

Utilising the foregoing parameters, a number of simulations have been performed of transmission over an optical channel 106 consisting of different lengths of standard single-mode optical fibre, having a dispersion of D=16 ps/nm/km. For a time-spread of one nanosecond to arise due to this level of dispersion over a signal bandwidth of 30 GHz, the corresponding transmission length is around 260 km. Accordingly, a prior art optical OFDM system employing a one-nanosecond guard interval, and no relative time delays between frequency bands, should exhibit significant degradation in received signal quality as the transmission length is increased beyond this distance. However, by dividing the transmitted subcarriers into two bands, and applying a one-nanosecond time delay, in accordance with the embodiment 100, it is anticipated that the transmission distance may be extended to approximately 500 km, before significant degradation in received signal quality is observed.

Figure 4A:
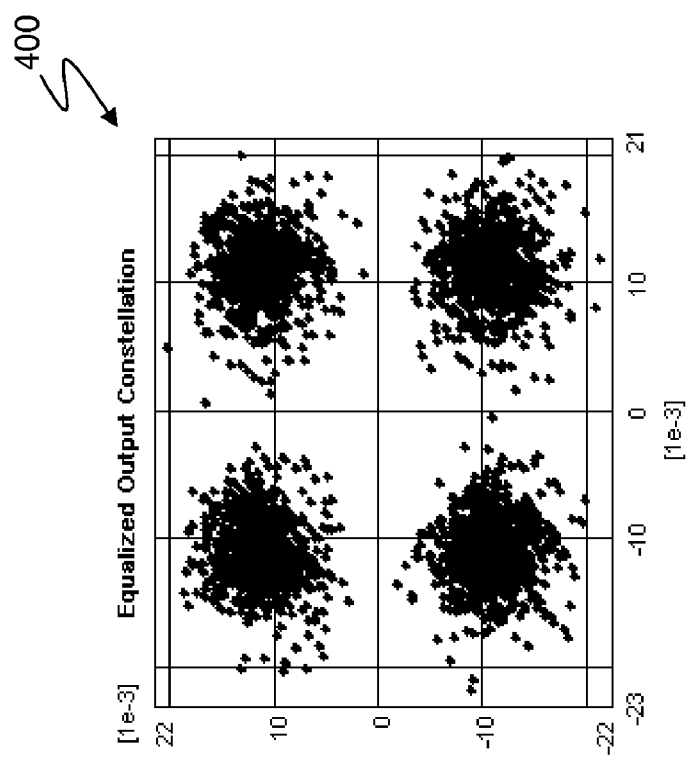

These predictions are confirmed by the simulation results shown in FIGS. 4A, 4B, 5A, 5B and 6. In particular, FIG. 4A shows an example constellation pattern 400 obtained from simulation of a prior art optical OFDM system over 500 km of dispersive optical fibre. A wide spread of these symbols at each point of the constellation is clearly apparent. The received electrical signal quality factor, Q, defined as the square of the mean distance of the symbols from a relevant axis divided by the corresponding variance, is 16.5 dB. By comparison, FIG. 4B shows the received constellation pattern in accordance with the system 100, in which two frequency bands are utilised. The symbols at each QAM constellation point are tightly clustered, and the Q value is 32.1 dB. As will be appreciated, this represents a significant improvement over the prior art system.

Figure 5B:
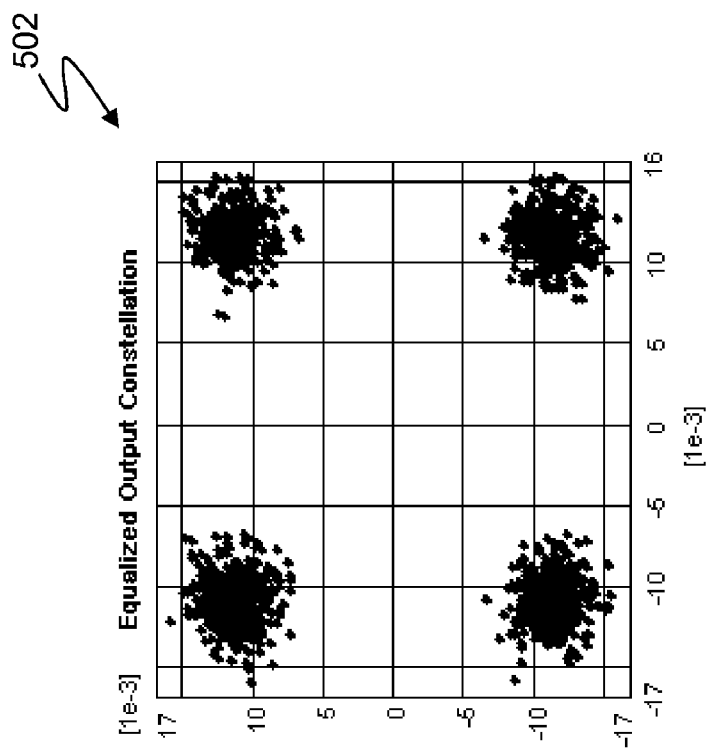
FIGS. 5A and 5B show example constellation patterns of received signals after transmission over 750 km of dispersive optical fibre.
Figure 5A:
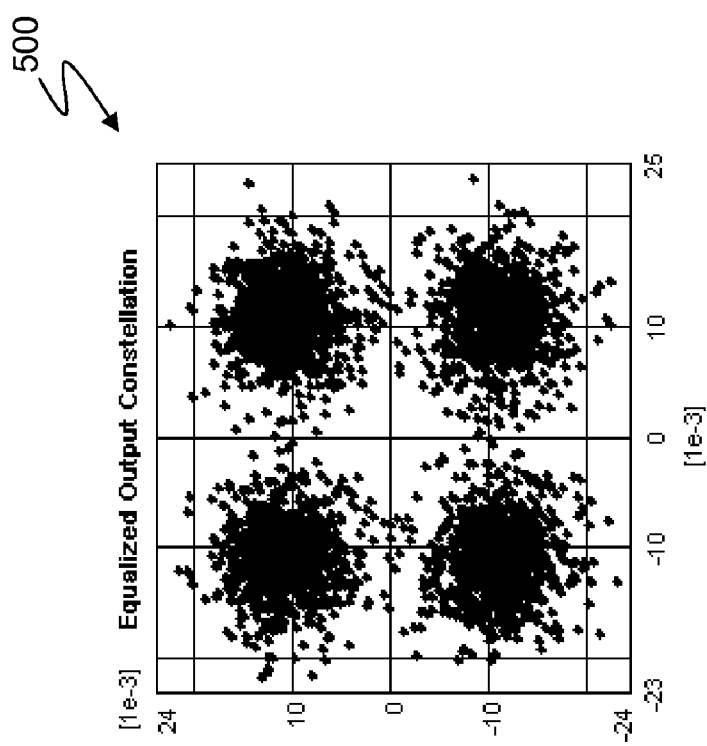
Figure 6:
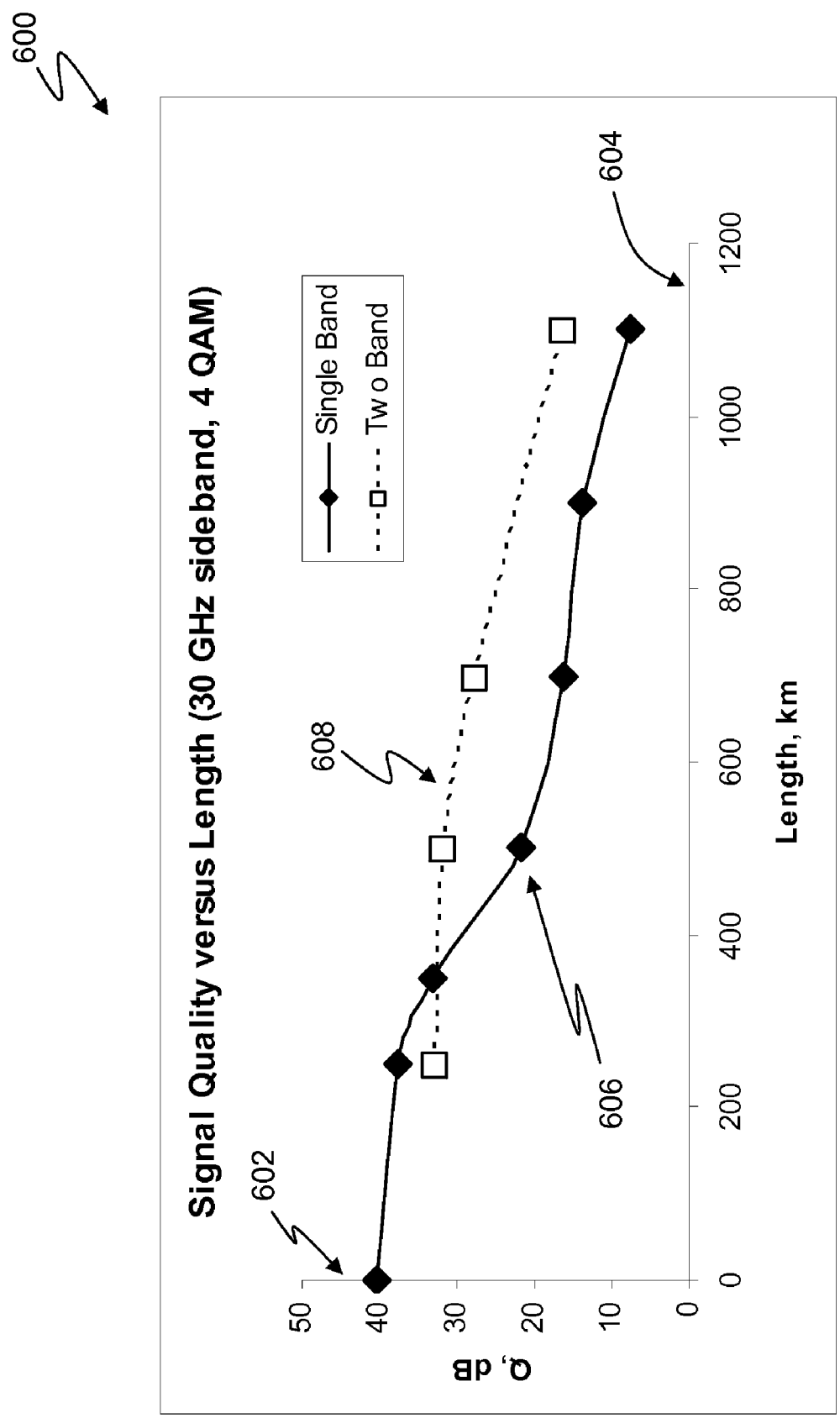
FIG. 6 shows a graph comparing received signal quality as a function of transmission length in accordance with the prior art, and with a preferred embodiment of the invention.

FIGS. 5A, 5B and 6 illustrate that the system 100 is relatively robust to variations in the transmission distance, and/or total dispersion experienced by the transmitted signal. FIGS. 5A and 5B show example constellation patterns of received signals after transmission over 750 km of dispersive optical fibre. In particular, the constellation pattern 500 is for a prior art optical OFDM system, utilising only a single band, and again a wide spread of symbols at each point of the constellation is plainly apparent, and the Q value 13.6 dB. By comparison, the two-band system 100 results in the constellation pattern 502, in which the symbols at each QAM constellation point are clearly clustered and distinguishable. Although inter-symbol interference is not entirely eliminated in this example, clear improvement over the prior art system is obtained, and the Q value is 24.4 dB (ie an improvement of over 10 dB).

FIG. 6 is a graph 600 comparing received signal quality as a function of transmission length in accordance with the prior art, and in accordance with the exemplary system 100. The Y-axis 602 of the graph 600 is the signal quality, Q, expressed in dB, whereas the X-axis 604 is the transmission length, over standard single-mode optical fibre having dispersion of D=16 ps/nm/km. The curve 606 represents the prior art, single-band, transmission system, whereas the curve 608 represents the exemplary system 100. For low levels of total dispersion, such as below the conventional threshold of 260 km, the system 100 slightly underperforms the prior art system. This is due to the discontinuity introduced by splitting the subcarriers into two bands, and delaying one band with respect to the other. That is, the discontinuity at the reference frequency 326, between the received red band 318 and the received blue band 316 results in some non-cyclic "leakage" between the bands, which in turn causes a small penalty in received signal quality. However, the results for the prior art system 606 clearly show the expected significant reduction in received signal quality once the transmission distance exceeds about 260 km, whereas a relatively high received signal quality is maintained in the results for the two-band system 608. It is therefore concluded that embodiments of the present invention are able to achieve improved received signal quality, while maintaining a lower overhead due to the requirement for a guard interval and cyclic prefix.

While a preferred embodiment 100 of the invention has been described herein, many variations will be apparent in view of the foregoing discussion, and it will therefore be appreciated that the invention is not to be limited to this specific embodiment. A number of potentially advantageous modifications and variations will therefore now be described.

The embodiment 100 may be modified in order to mitigate the initial penalty (ie at lower levels of dispersion) due to the discontinuity between the two frequency bands. In one such modification, the delay 312 may be made slightly shorter than the guard interval and cyclic prefix 308, 310, either by reducing the duration of the delay, or by increasing the duration of the guard interval. As will be appreciated, this will result in additional overlap between the higher-frequency components of the red band, and the lower-frequency components of the blue band, within the FFT window 330, thereby reducing the level of non-cyclic inter-symbol interference. Alternatively, a frequency guard band may be created between the red and blue bands, for example by leaving corresponding inputs of the inverse FFTs 114a, 114b as unused inputs. The disadvantage with either of these approaches is a slight increase in the transmission overhead, and corresponding loss in total data transmission capacity within a specified bandwidth.

More generally, the duration of the delay 312 may be greater or less than the duration of the guard interval and cyclic prefix 308, 310, depending upon the total dispersion of the transmission channel 106 and/or the total bandwidth of the transmitted sideband 204. A further factor is the number of frequency bands into which the overall transmitted signal is divided. It is presently considered that an optimal configuration is one in which the appropriately selected delay is approximately equal to the duration of the guard intervals. Accordingly, once a maximum acceptable overhead due to the guard interval has been determined (eg one-sixteenth of the total symbol duration), and the total dispersion of the optical channel 106 is known, the total number of bands, and the appropriate delay between each band, may be selected accordingly. While it may not always be practical or desirable to set the delay equal to the duration of the guard interval, it may be preferable that the delay be selected within the range of 0.5 to 2.0 times the guard interval duration.

It should further be appreciated that a number of different implementations for division of the signal into a number of different frequency bands may be available. The approach shown in the exemplary embodiment 100, in which a separate inverse FFT is utilised for each band, is one possible approach. In one implementation of this type, each inverse FFT may have sufficient inputs and outputs to cover the full signal spectrum, with inputs corresponding with the other frequency bands set to zero, such that the resulting output time domain signals may be correctly combined, eg by simple addition. Alternatively, each inverse FFT may operate at baseband, with the outputs subsequently being up-converted to the appropriate frequency range prior to combination. Furthermore, combination of the signals may be performed in the digital domain, as in the exemplary embodiment 100, prior to digital-to-analog conversion. Alternatively, the separate frequency bands may be converted into analog signals, and then combined within the analog domain, in which case appropriate frequency conversions may also be performed in the analog domain. All such arrangements, and other equivalent implementations, fall within the scope of the present invention.

Other variations and modifications will also be apparent to those skilled in the art, and it is therefore emphasised that the scope of the invention is not limited by the foregoing description, but rather is defined by the claims appended hereto.

What is claimed:

1. A method of transmitting digital information over a dispersive optical channel, comprising the steps of:
    encoding the digital information into a series of data blocks, each block comprising a plurality of substantially orthogonal frequency domain subcarriers;
    dividing each data block into at least two frequency bands, each band comprising a plurality of contiguous subcarriers;
    performing a frequency-time transformation of each band to form a corresponding plurality of transformed bands, each transformed band comprising a sequence of time domain data samples;
    applying a time delay to at least one of the transformed bands relative to at least one other of the transformed bands;
    combining the transformed bands to produce an electrical signal waveform embodying the digital information; and
    modulating an optical source using the electrical signal waveform, to produce a corresponding optical signal for transmission over the dispersive optical channel.

2. The method of claim 1, further comprising the step of inserting a guard interval having a predetermined duration between consecutive data blocks of each transformed band.

3. The method of claim 2 wherein said predetermined duration of the guard interval is greater than the maximum time delay due to dispersion of the optical channel across any one of the transmitted frequency bands.

4. The method of claim 3 wherein each guard interval precedes a corresponding data block, and is populated with a copy of data symbols comprising an end portion of the corresponding transformed band.

5. The method of claim 3 wherein each guard interval follows a corresponding data block, and is populated with a copy of data symbols comprising an initial portion of the corresponding transformed band.

6. The method of claim 3 wherein a maximum difference in the time delays applied to the transformed bands is between 0.5 and 2.0 times the duration of the guard interval.

7. The method of claim 2 wherein each guard interval precedes a corresponding data block, and is populated with a copy of data symbols comprising an end portion of the corresponding transformed band.

8. The method of claim 2 wherein each guard interval follows a corresponding data block, and is populated with a copy of data symbols comprising an initial portion of the corresponding transformed band.

9. The method of claim 2 wherein a maximum difference in the time delays applied to the transformed bands is between 0.5 and 2.0 times the duration of the guard interval.

10. The method of claim 9 wherein the maximum difference in the time delays applied to the transformed bands is approximately equal to the duration of the guard interval.

11. An apparatus for transmitting digital information over a dispersive optical channel, the apparatus comprising:
   an encoder configured to encode the digital information into a series of data blocks, each block comprising a plurality of substantially orthogonal frequency domain subcarriers, and wherein each data block comprises at least two frequency bands including a plurality of contiguous subcarriers;
   one or more frequency-time transformers configured to transform each band to form a corresponding plurality of transformed bands each comprising a sequence of time domain data samples;
   a time domain processor configured to apply a time delay to at least one of the transformed bands relative to at least one other of the transformed bands, and to combine the transformed bands to produce an electrical signal waveform embodying the digital information; and
   an optical transmitter comprising an optical source and an optical modulator, wherein the signal waveform is applied to the optical modulator to produce a corresponding optical signal for transmission over the dispersive optical channel.

12. The apparatus of claim 11 wherein the time domain processor is further configured to insert a guard interval having a predetermined duration between consecutive data blocks of each transformed band.

13. The apparatus of claim 12 wherein said predetermined duration of the guard interval is greater than the maximum time delay due to dispersion of the optical channel across any one of the transmitted frequency bands.

14. The apparatus of claim 13 wherein the time domain processor is configured to insert the guard intervals prior to each corresponding data block, and to populate each guard interval with a copy of data symbols comprising an end portion of the corresponding transformed band.

15. The apparatus of claim 13 wherein the time domain processor is configured to insert the guard intervals following each corresponding data block, and to populate each guard interval with a copy of data symbols comprising an initial portion of the corresponding transformed band.

16. The apparatus of claim 13 wherein the time domain processor is configured to apply time delays such that a maximum difference in the time delays applied to the transformed bands is between 0.5 and 2.0 times the duration of the guard interval.

17. The apparatus of claim 12 wherein the time domain processor is configured to insert the guard intervals prior to each corresponding data block, and to populate each guard interval with a copy of data symbols comprising an end portion of the corresponding transformed band.

18. The apparatus of claim 12 wherein the time domain processor is configured to insert the guard intervals following each corresponding data block, and to populate each guard interval with a copy of data symbols comprising an initial portion of the corresponding transformed band.

19. The apparatus of claim 12 wherein the time domain processor is configured to apply time delays such that a maximum difference in the time delays applied to the transformed bands is between 0.5 and 2.0 times the duration of the guard interval.

20. The apparatus of claim 19 wherein the time domain processor is configured to apply time delays such that a maximum difference in the time delays applied to the transformed bands is approximately equal to the duration of the guard interval.

* * * * *